(12) United States Patent
Lee et al.

(10) Patent No.: US 9,908,424 B2
(45) Date of Patent: Mar. 6, 2018

(54) WIRELESS CHARGING SYSTEM

(71) Applicant: Hyundai Motor Company, Seoul (KR)

(72) Inventors: Woo Young Lee, Chungcheongbuk-Do (KR); Tae Jong Ha, Seoul (KR); In Yong Yeo, Gyeonggi-Do (KR); Byeong Seob Song, Gyeonggi-Do (KR); Gyu Yeong Choe, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 301 days.

(21) Appl. No.: 14/694,623

(22) Filed: Apr. 23, 2015

(65) Prior Publication Data

US 2016/0137072 A1    May 19, 2016

(30) Foreign Application Priority Data

Nov. 13, 2014    (KR) .................. 10-2014-0158266

(51) Int. Cl.
  *H02J 7/00*    (2006.01)
  *B60L 11/18*    (2006.01)

(52) U.S. Cl.
  CPC ......... *B60L 11/182* (2013.01); *B60L 11/1838* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
  CPC . H02J 50/10; H02J 17/00; H02J 7/025; B60L 11/182
  USPC .......................................... 320/108; 307/104
  See application file for complete search history.

(56) References Cited

U.S. PATENT DOCUMENTS

| 2011/0101790 A1* | 5/2011 | Budgett ................ A61M 1/127 307/104 |
| 2013/0119779 A1* | 5/2013 | Jung .................... H01F 27/2871 307/104 |
| 2013/0127411 A1* | 5/2013 | Ichikawa .............. B60L 11/182 320/108 |
| 2013/0241300 A1* | 9/2013 | Miyamoto .............. H01F 5/003 307/104 |

FOREIGN PATENT DOCUMENTS

| JP | 2012-178417 | 4/2010 |
| JP | 2011-072074 A | 4/2011 |
| JP | 2012-034431 | 2/2012 |
| JP | 2012-109449 | 6/2012 |
| JP | 2010-073976 | 9/2012 |

(Continued)

*Primary Examiner* — Drew A Dunn
*Assistant Examiner* — Zixuan Zhou
(74) *Attorney, Agent, or Firm* — Mintz Levin Cohn Ferris Glovsky and Popeo, P.C.; Peter F. Corless

(57) ABSTRACT

A wireless charging system of a vehicle includes: a transmitting coil module including a plurality of transmitting coils; and a receiving coil module including a plurality of receiving coils receiving power by electronic resonance with the plurality of transmitting coils. The plurality of transmitting coils have a winding structure which is formed by a conductive wire causing a direction of a magnetic field generated by any one of the plurality of transmitting coils different from a direction of a magnetic field generated by a transmitting coil directly adjacent to the one transmitting coil by making a current flow in the plurality of transmitting coils.

5 Claims, 9 Drawing Sheets

(56) References Cited

FOREIGN PATENT DOCUMENTS

| | | |
|---|---|---|
| JP | 2012-073976 | 9/2012 |
| JP | 2014-131370 A | 7/2014 |
| WO | 2012/124029 | 9/2012 |

* cited by examiner

WIRELESS CHARGING SYSTEM

CROSS REFERENCE TO RELATED APPLICATION

The present application claims priority to and benefit of Korean Patent Application Number 10-2014-0158266 filed on Nov. 13, 2014, the entire contents of which are incorporated herein by reference.

BACKGROUND

1. Technical Field

The present disclosure relates to a wireless charging system, and more particularly, to a wireless charging system capable of preventing output and power transmission efficiency from being suddenly reduced even though a deviation between a transmitting coil and a receiving coil occurs.

2. Description of the Related Art

Recently, technology surrounding plug-in hybrid vehicles and electric vehicles has rapidly developed. In hybrid or electric vehicles, some or all of driving force is electric energy. In order to charge electric energy, methods for putting a wired plug connected to a charger in an outlet and for wirelessly charging electric energy have been used.

The method for wirelessly charging electric energy can be classified into two types: electromagnetic induction and resonance. In the case of the electromagnetic induction charging, a power transmittable distance between the transmitting coil (buried in a parking space, for example) and the receiving coil (equipped in the vehicle, for example) is very short. Therefore, resonance charging has been adopted to secure a power transmission length longer than that of electromagnetic induction charging.

Problematically, when there is no accurate matching between the transmitting coil and the receiving coil, output and charging efficiency may be suddenly reduced. To solve this problem, a method for increasing a size of the transmitting coil and the receiving coil has been proposed but may suddenly increase electromagnetic wave emissions.

FIGS. 1A and 1B are diagrams illustrating a structure of a transmitting coil and the receiving coil according to the related art and a direction of magnetic field in the structure. Both of the transmitting coil and the receiving coil have a circular shape, and a tolerance in an x-direction and a y-direction between the coils relies on a diameter of each coil. Theoretically, when deviations in the x-direction and the y-direction of the transmitting coil and the receiving coil occur due to a diameter of a coil, the output is reduced to 0. When a diameter of the coils is increased, the structure of the transmitting coil and the receiving coil is insensitive to the deviations in the x-direction and the y-direction of the coils, but has the increased size and material costs and the increased electromagnetic wave emissions to the surroundings, thereby making it difficult to satisfy an electromagnetic wave standard.

FIGS. 2A and 2B are diagrams schematically illustrating a wireless charging system having a solenoid type coil structure. The tolerance in the y-direction of the transmitting coil and the receiving coil relies on a width Wo of a core of the receiving coil. However, the tolerance in the x-direction is larger than that in the y-direction. That is, the transmitting and receiving coils illustrated in FIGS. 2A and 2B embodies a slightly improved tolerance in the x-direction over the circular transmitting and receiving coils illustrated in FIGS. 1A and 1B. Further, in the coils having the form as illustrated in FIGS. 2A and 2B, a magnetic field is generated in front of and in back of the vehicle, and therefore, the electromagnetic wave emissions generated at both sides of the vehicle may also be reduced.

However, when a deviation in the y-direction still occurs, the output and power transmission efficiency may be reduced. Therefore, there is a need to develop a wireless charging system capable of preventing the output and power transmission efficiency from being suddenly reduced even though the transmitting coil and the receiving coil are positioned to deviate from each other.

SUMMARY

An object of the present disclosure is to provide a wireless charging system capable of preventing output and power transmission efficiency from being suddenly reduced even though a deviation between a transmitting coil and a receiving coil occurs.

According to embodiments of the present disclosure, there is provided a wireless charging system of a vehicle, including: a transmitting coil module including a plurality of transmitting coils; and a receiving coil module including a plurality of receiving coils receiving power by electronic resonance with the plurality of transmitting coils. The plurality of transmitting coils have a winding structure which is formed by a conductive wire causing a direction of a magnetic field generated by any one of the plurality of transmitting coils different from a direction of a magnetic field generated by a transmitting coil directly adjacent to the one transmitting coil by making a current flow in the plurality of transmitting coils.

The plurality of transmitting coils may include a plurality of cores which are disposed on the transmitting coil module to be symmetrical to each other in a horizontal direction, a vertical direction, or a diagonal direction, and the conductive wire may be wound around the plurality of cores.

The transmitting coil module may include four unit transmitting coils that are each configured of a core and a portion of the conductive wire that is wound around the core.

One end of the conductive wire may be connected to and extend from a power supply unit, may be wound in a first direction around a core included in a first coil of the plurality of transmitting coils, and may be wound around a core included in a second coil of the plurality of transmitting coils. The second coil may be symmetrical in a horizontal or vertical direction to the first coil and positioned adjacent thereto in a second direction.

The conductive wire may be wound in the first direction around cores which are included in a third coil of the plurality of transmitting coils and is wound in the second direction around cores which are included in a fourth coil of the plurality of transmitting coils. The third coil may be symmetrical in a diagonal direction to the first coil, and the fourth coil may be symmetrical in a diagonal direction to the second coil The other end of the conductive wire may be wound around a core included in the fourth coil and may be connected to the power supply unit.

The plurality of receiving coils may include a plurality of cores which are disposed on the receiving coil module in a horizontal direction, a vertical direction, or a diagonal direction.

The receiving coil module may be divided into a plurality of receiving coil groups each including some of the plurality of receiving coils, and the plurality of receiving coil groups may each have a winding structure formed by using a conductive wire.

The receiving coil module may include the plurality of unit receiving coils each having cores, the unit receiving coils may be classified into the plurality of receiving coil groups including some of the plurality of unit receiving coils, and unit receiving coils included in each of the plurality of receiving coil groups may have a winding structure formed by using a conductive wire.

The plurality of unit receiving coils may be formed of four unit receiving coils, and each of the plurality of receiving coil groups may include any two of the four unit receiving coils.

Some of the plurality of receiving coil groups may include the same unit receiving coil.

Each of the plurality of receiving coil groups may include a group of the receiving coils which are disposed in a front and rear direction of the vehicle among the receiving coils and a group of the receiving coils which are disposed in both side directions of the vehicle among the receiving coils.

The conductive wire may extend from a power supply unit and may be formed in an 8-like shape in which cores included in the plurality of transmitting coils are wound and are disposed in front and rear directions of the vehicle.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF THE EMBODIMENTS

Figure 1A:
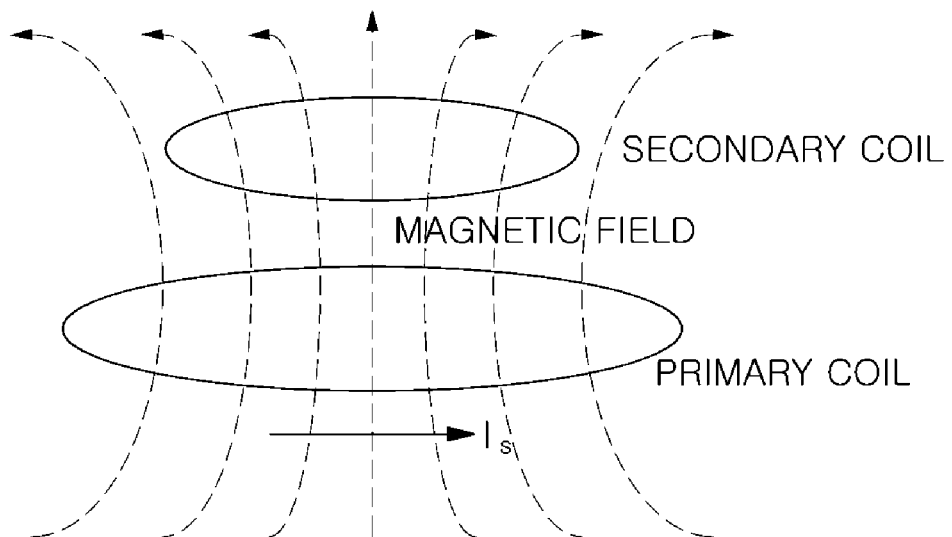
FIGS. 1A and 1B are diagrams illustrating a structure of a transmitting coil and the receiving coil according to the related art and a direction in magnetic field in the structure.
Figure 1B:
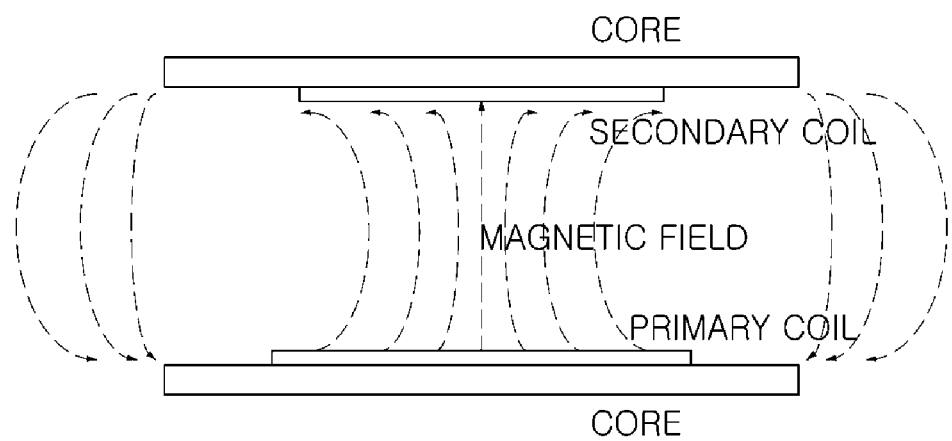
Figure 2A:
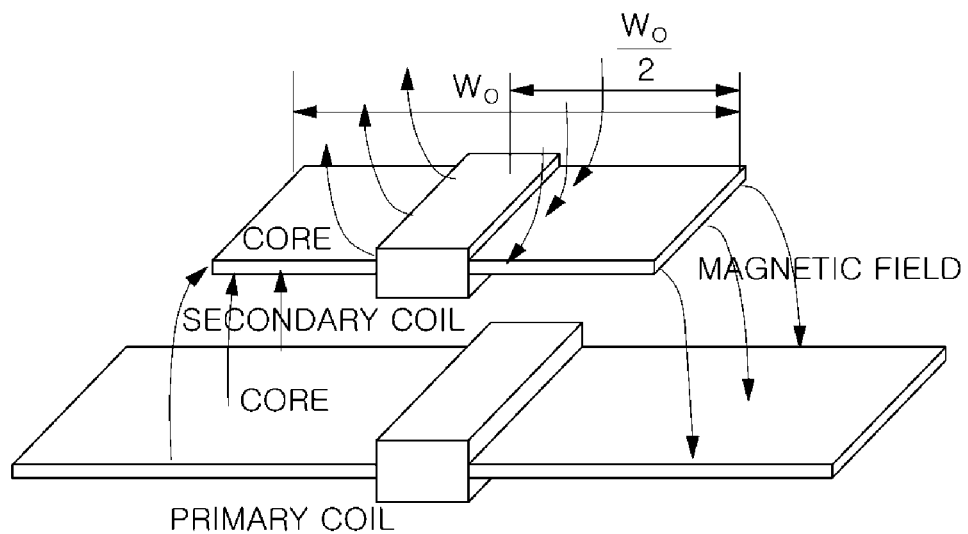
FIGS. 2A and 2B are diagrams schematically illustrating a wireless charging system having a solenoid type coil structure.
Figure 2B:
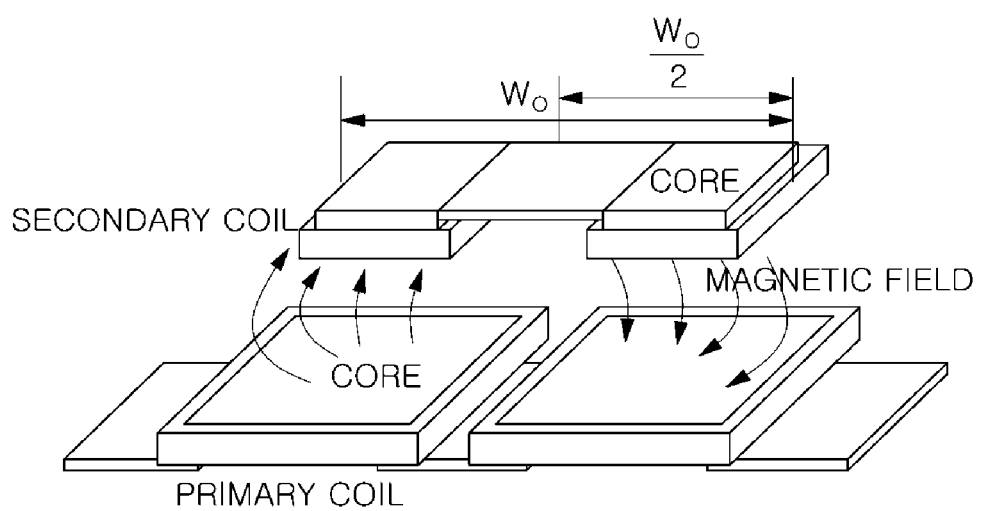

Specific structural and functional descriptions will be provided only in order to describe various embodiments of the present disclosure disclosed in the present specification or disclosure. Therefore, embodiments of the present disclosure may be implemented in various forms, and the present disclosure is not to be interpreted as being limited to embodiments described in the present specification or disclosure.

The embodiments of the present disclosure may be variously modified and have various forms and therefore specific embodiments are illustrated in the accompanying drawings and will be described in detail in the present specification or the present application. However, it is to be understood that the present disclosure is not limited to specific exemplary embodiments, but includes all modifications, equivalents, and substitutions included in the spirit and the scope of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Terms such as 'first', and/or 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", or "neighboring to", "directly neighboring to" and the like, should be similarly interpreted.

Terms used in the present specification are used only in order to describe specific embodiments rather than limiting the present disclosure. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly indicates otherwise.

Hereinafter, embodiments of the present disclosure will be described in detail with reference to the accompanying drawings. Like reference numerals proposed in each drawing denote like components.

Figure 3:
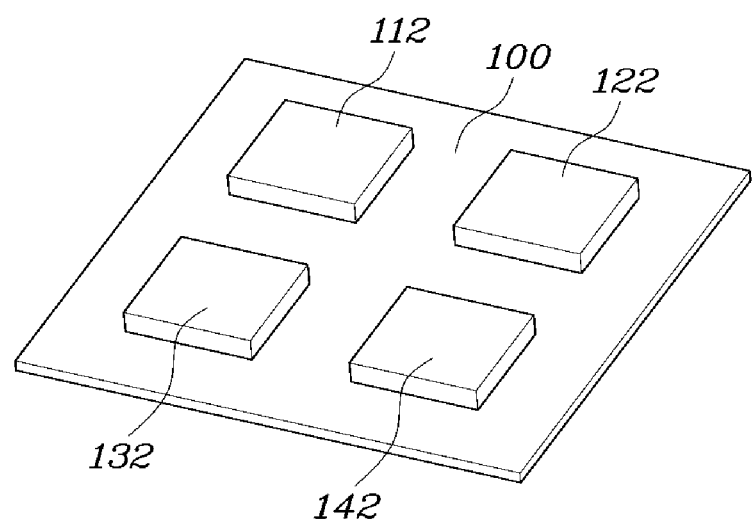
FIG. 3 is a diagram illustrating a core structure of a transmitting coil according to embodiments of the present disclosure.
Figure 4:
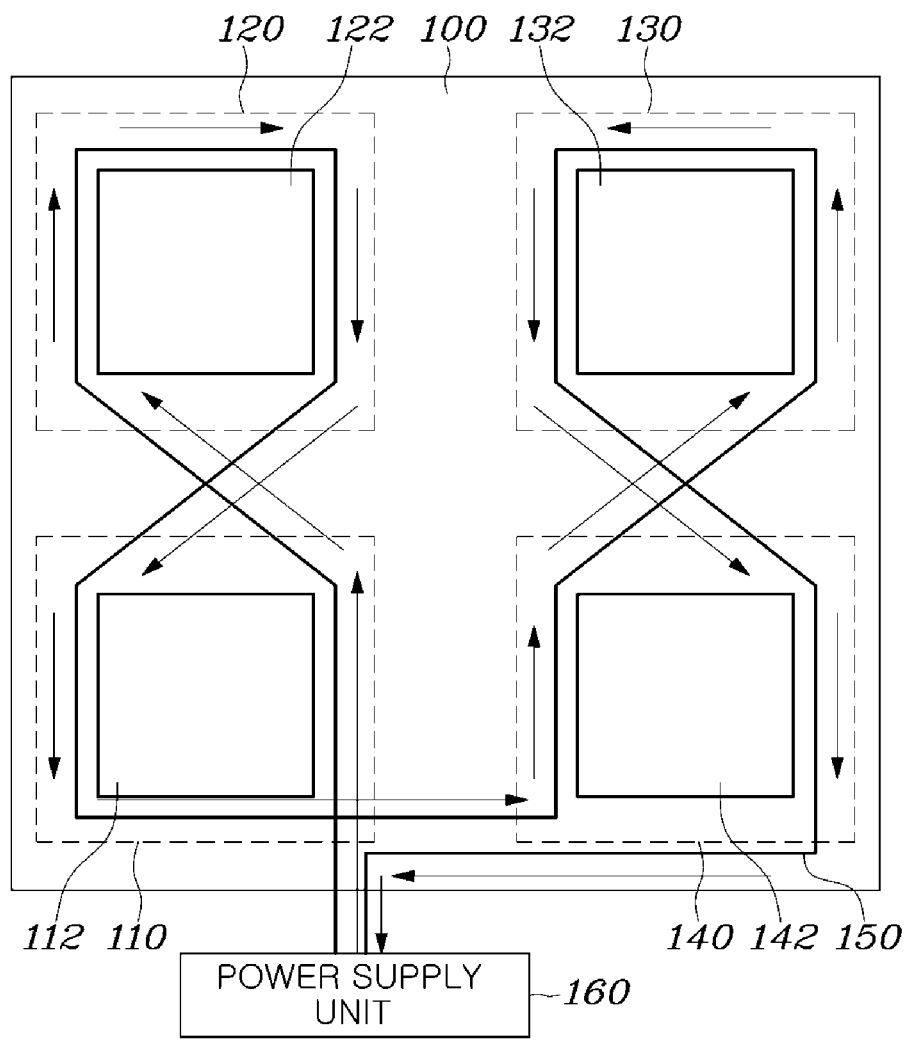
FIG. 4 is a diagram illustrating a coil winding structure of the transmitting coil according to embodiments of the present disclosure and a direction in current supplied from a power supply unit.
Figure 5:
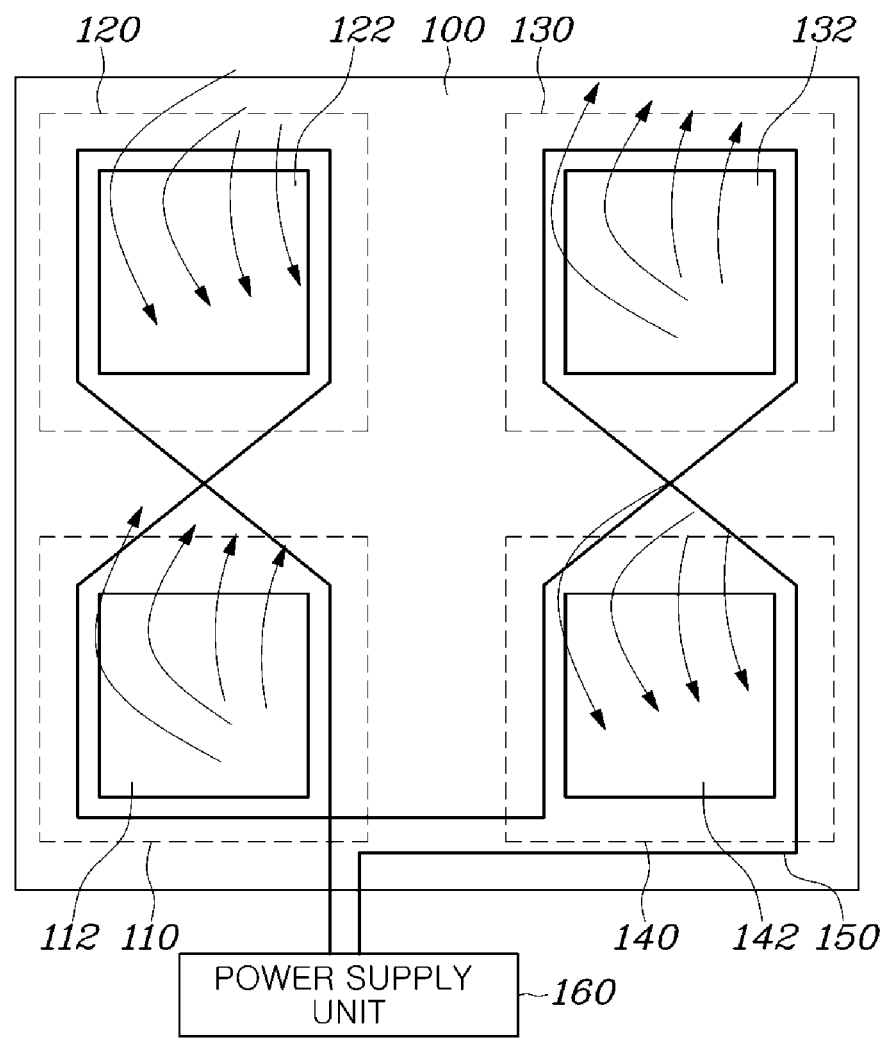
FIG. 5 is a diagram illustrating a direction in magnetic field generated depending on the coil winding structure and the direction in current which are illustrated in FIG. 4.

FIG. 3 is a diagram illustrating a core structure of a transmitting coil according to embodiments of the present disclosure. FIG. 4 is a diagram illustrating a coil winding structure of the transmitting coil according to embodiments of the present disclosure and a direction in current supplied from a power supply unit. FIG. 5 is a diagram illustrating a direction in magnetic field generated depending on the coil winding structure and the direction in current which are illustrated in FIG. 4.

A wireless charging system according to embodiments of the present disclosure includes a transmitting coil module 100 which includes a plurality of transmitting coils 110, 120, 130, and 140 and a receiving coil module which includes a plurality of receiving coils receiving power by electronic resonance with the transmitting coils 110, 120, 130, and 140, in which the plurality of transmitting coils 110, 120, 130, and 140 have a winding structure which is formed by using one conductive wire 150 to make a direction in magnetic field generated in any one of the plurality of transmitting coils 110, 120, 130, and 140 different from a direction in magnetic field generated in the transmitting coil directly adjacent to any one of the transmitting coils by making a current flow in the plurality of transmitting coils 110, 120, 130, and 140.

In detail, the transmitting coil module 100 includes a plurality of transmitting coils 110, 120, 130, and 140, in which the plurality of transmitting coils 110, 120, 130, and 140 may each include cores 112, 122, 132, and 142 and include a portion of the conductive wire 150.

When a current flows as illustrated in FIG. 4, as illustrated in FIG. 5, the direction in magnetic field generated in the first transmitting coil 110 is a direction in which the magnetic field comes out up the coil in the first transmitting coil 110, the direction in magnetic field generated in the second transmitting coil 120 is a direction in which the magnetic field comes in down the coil, the direction in magnetic field generated in the third transmitting coil 130 is a direction in which the magnetic field comes out up the coil, and the direction in magnetic field generated in the fourth transmitting coil 140 is a direction in which the magnetic field comes in down the coil. That is, the direction in the magnetic field generated in the first transmitting coil 110 is an opposite direction to the direction in the magnetic field generated in the second transmitting coil 120 and the fourth transmitting coil 140 which are transmitting coils adjacent to the first transmitting coil 110.

The plurality of transmitting coils 110, 120, 130, and 140 may include a plurality of cores 112, 122, 132, and 142 which are disposed on the transmitting coil module 100 to be symmetrical to each other in a horizontal direction, a vertical direction, or a diagonal direction and one conductive wire 150 which is wound around the plurality of cores 112, 122, 132, and 142. The transmitting coil module 100 includes four unit transmitting coils 110, 120, 130, and 140, in which four unit transmitting coils 110, 120, 130, and 140 may each include the cores 112, 122, 132, and 142 and a portion of the conductive wire 150 which is wound around the cores 112, 122, 132, and 142.

The transmitting coil module 100 is buried in a parking space and may be formed based on a front direction, a rear direction, and side directions of the vehicle. That is, the first coil 110 and the second coil 120 and the third coil 130 and the fourth coil 140 may be positioned to correspond to the front and rear directions of the vehicle, while the second coil 120 and the third coil 130 and the first coil 110 and the fourth coil 140 may be positioned to correspond to the side directions of the vehicle. When the transmitting coil module 100 illustrated in FIG. 4 is buried as described above, an amount of electromagnetic wave leaked to the side directions of the vehicle may be reduced.

One end of the conductive wire 150 extends from the power supply unit 160, being connected to the power supply unit 160 and may be wound around the core 112 included in the first coil 110 among the cores 112, 122, 132, and 142 in a first direction and may be wound around the core included in the second coil 120, which is symmetrical in a horizontal or vertical direction to the first coil 110 and positioned to be directly adjacent thereto, in a second direction. That is, in order to make the directions in the magnetic field, which is generated by making a current flow in the transmitting coils positioned to be directly adjacent to each other, reverse each other, the conductive wire extending from the power supply unit 160 passes through one surface which is an internal direction of the core 112 included in the first coil 110, passes through one surface which is an external direction of the core 122 included in the second coil 120, again passes through one surface which is an external direction of the core 112 included in the first coil 110 after the second coil 120 is wound, and extends to the fourth coil 140 side.

Next, the conductive wire 150 passes through one surface which is an internal direction of the core 142 included in the fourth coil 140, passes through one surface which is an external direction of the core 132 included in the third coil 130, again passes through one surface which is an external direction of the core 142 included in the fourth coil 140 after the third coil 130 is wound, and is connected to the power supply unit 160. That is, the conductive wire 150 extends from the power supply unit 160 and thus may be formed in a form in which the cores 112 and 122 and 132 and 142 included in the plurality of transmitting coils 110 and 120 and 130 and 140 which are disposed in the front and rear directions of the vehicle are wound in an 8-like shape.

For example, the conductive wire 150 may be wound around the cores 112 and 132, which are included in the third coil 130 positioned to be symmetrical in a diagonal direction to the first coil 110, in the first direction (e.g., counterclockwise direction) and may be wound around the cores 122 and 142, which are included in the fourth coil 140 positioned to be symmetrical in a diagonal direction to the second coil 110, in the second direction (e.g., clockwise direction). The other end of the conductive wire 150 wound around the core 142 included in the fourth coil 140 may be connected to the power supply unit 160.

Figure 6A:
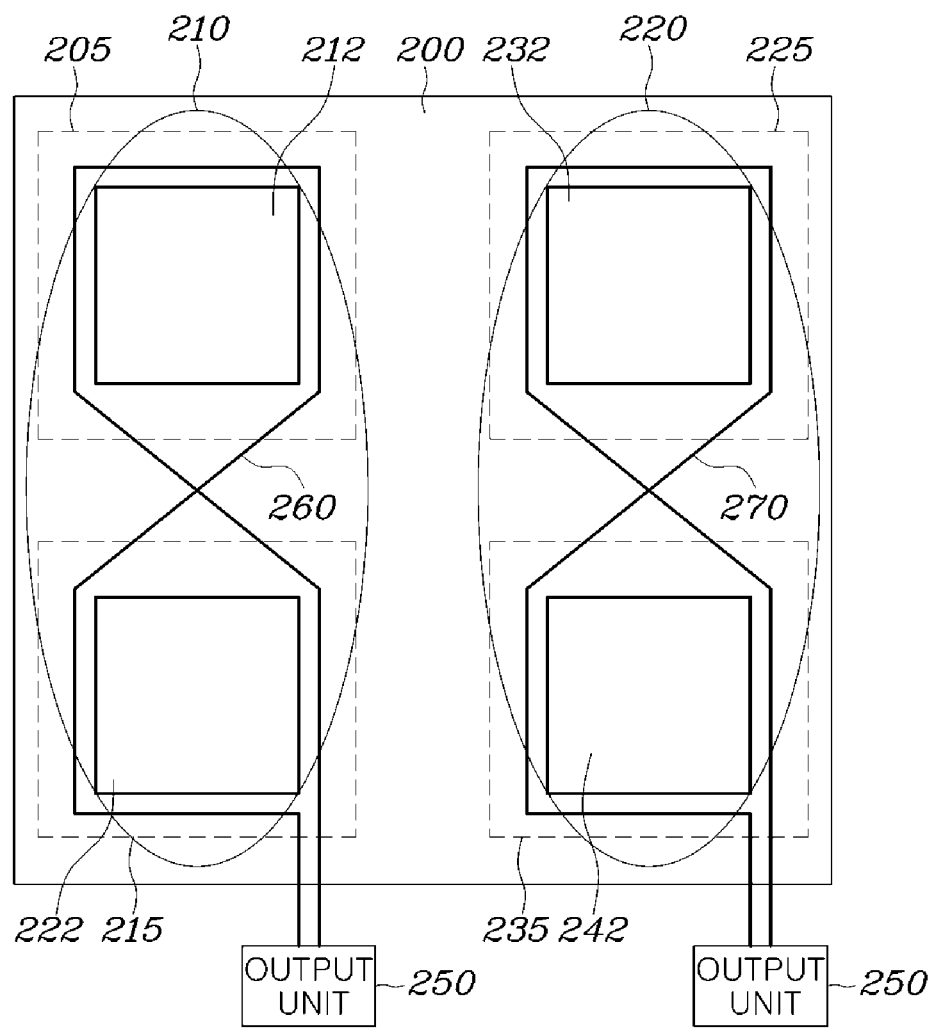
FIGS. 6A to 6C are diagrams illustrating a coil winding structure of a receiving coil according to embodiments of the present disclosure and an output unit to which receiving coils are connected.
Figure 6B:
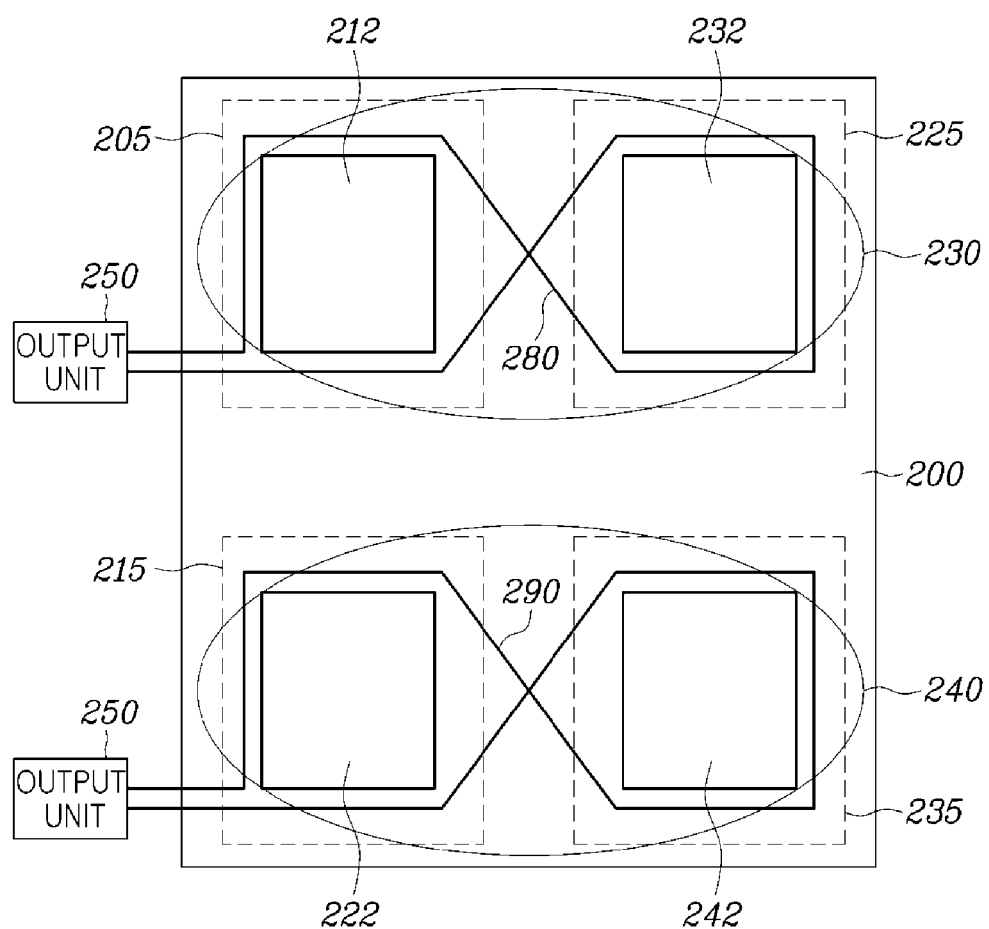
Figure 6C:
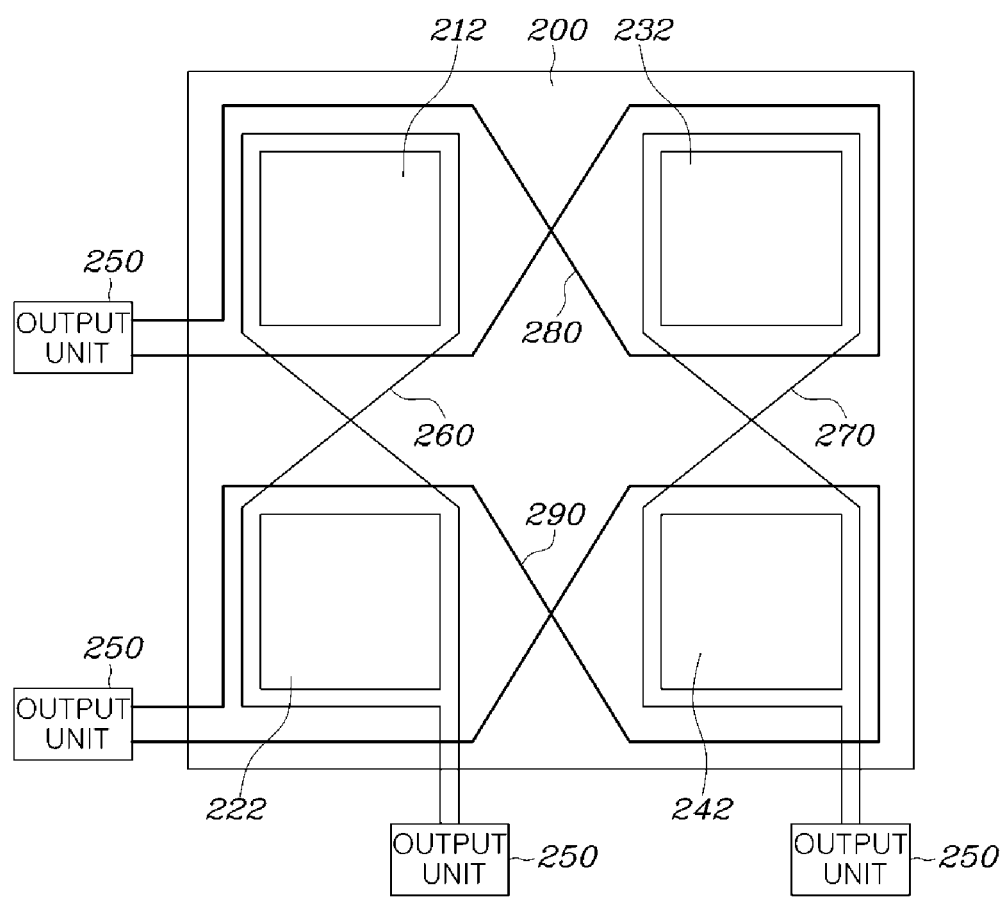
Figure 7A:
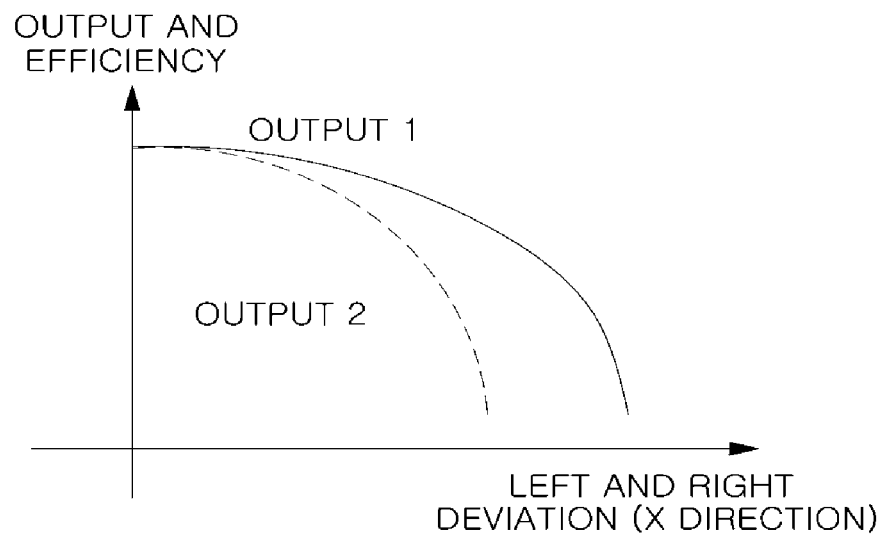
FIGS. 7A and 7B are graphs schematically illustrating output and power transmission efficiency of the receiving coil side for deviations in an x direction and a y direction between the transmitting coil and the receiving coil, in the wireless charging system according to embodiments of the present disclosure.
Figure 7B:
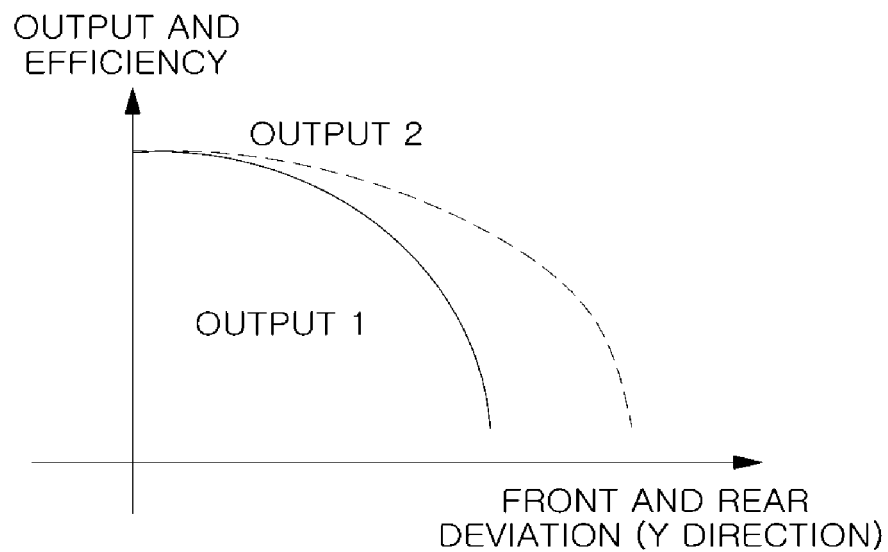

FIGS. 6A to 6C are diagrams illustrating a coil winding structure of a receiving coil according to embodiments of the present disclosure and an output unit to which receiving coils are connected. FIGS. 7A and 7B are graphs schematically illustrating output and power transmission efficiency of the receiving coil side for deviations in an x-direction and a y-direction between the transmitting coil and the receiving coil, in the wireless charging system according to embodiments of the present disclosure.

A plurality of receiving coils 205, 215, 225, and 235 may include a plurality of cores 212, 222, 232, and 242 which are disposed on a receiving coil module 200 to be symmetrical in a horizontal direction, a vertical direction, or a diagonal direction. The receiving coil module 200 is divided into a plurality of receiving coil groups 210, 220, 230, and 240 including some of the plurality of receiving coils 205, 215, 225, and 235, in which the plurality of receiving coil groups 210, 220, 230, and 240 each have a winding structure formed by using one of conductive wires 260, 270, 280, and 290.

The receiving coil module 200 includes the plurality of unit receiving coils 205, 215, 225, and 235 each having the cores 212, 222, 232, and 242, in which the unit receiving coils 205, 215, 225, and 235 are classified into the plurality of receiving coil groups 210, 220, 230, and 240 including some of the plurality of unit receiving coils 205, 215, 225, and 235 and the receiving coils configuring each receiving coil group have a winding structure formed by using one conductive wire.

In detail, the plurality of unit receiving coils include four unit receiving coils 205, 215, 225, and 235 and the receiving coil groups 210, 220, 230, and 240 may include any two of the unit receiving coils 205, 215, 225, and 235.

Referring to FIGS. 6A and 6B, the receiving coils 205, 215, 225, and 235 may be classified into a first group 210 including the first receiving coil 205 and the second receiving coil 215, a second group 220 including the third receiving coil 225 and the fourth receiving coil 235, a third group 230 including the first receiving coil 205 and the third receiving coil 225, and a fourth group 240 including the second receiving coil 215 and the fourth receiving coil 235. Further, each group is wound with the same conductive wire. For example, the first receiving coil 205 and the second receiving coil 215 configuring the first group 210 are wound with the first conductive wire 260 and the third receiving coil 225 and the fourth receiving coil 235 configuring the second group 220 are wound with the second conductive wire 270. Further, the first receiving coil 205 and the third receiving coil 225 configuring the third group 230 are wound with a third conductive wire 280 and the second receiving coil 215 and the fourth receiving coil 235 configuring the fourth group 240 are wound with a fourth conductive wire 290.

Some of the plurality of receiving coil groups 210, 220, 230, and 240 may include the same unit receiving coil. For example, both of the first group 210 and the third group 230 include the first receiving coil 205 and both of the second group 220 and the fourth group 240 include the fourth receiving coil 235. The receiving coil groups 210, 220, 230, and 240 may include the groups 210 and 220 of the receiving coils which are disposed in the front and rear directions (e.g., y-direction in the figures) of the vehicle among the receiving coils 205, 215, 225, and 235 and the groups 230 and 240 of the receiving coils which are disposed in both side directions of the vehicle among the receiving coils 205, 215, 225, and 235.

Referring to FIGS. 7A and 7B, the x-direction means both side directions of the vehicle and the y-direction means the front and rear directions of the vehicle. That is, the alignment deviation of the transmitting coils and the receiving coils in both side directions of the vehicle is left and right deviations and the alignment deviation of the transmitting coils and the receiving coils in the front and rear directions of the vehicle is front and rear deviations. As illustrated in FIG. 6C, even though the receiving coil is formed and thus the deviation occurs in any one direction, the winding is formed in another direction and therefore the output and power transmission efficiency of the receiving coils may be secured.

As illustrated in FIGS. 7A and 7B, output 1 means an output of the output unit 250 illustrated in FIG. 6A and output 2 means an output of the output unit 250 illustrated in FIG. 6B. That is, the output 1 is suddenly reduced when the alignment deviation of the transmitting coil and the receiving coil in the front and rear directions (e.g., y-direction) of the vehicle occurs and the output 2 is suddenly reduced as the alignment deviation of the transmitting coil and the receiving coil in both side directions of the vehicle is increased. However, it is appreciated that the output of the receiving coil is more slowly reduced in the case of the output 1 than in the case of the output 2, even though the alignment deviation in both side directions (e.g., x-direction) is increased. Further, it is appreciated that the output of the receiving coil is more slowly reduced in the case of the output 2 than in the case of the output 1, even though alignment deviation in the front and rear directions (e.g., y-direction) is increased. Therefore, even though the alignment deviation is increased in all directions, any one of the output 1 or the output 2 is slowly reduced, and therefore even though the deviation in the front and rear directions and both side directions between the transmitting coil and the receiving coil occurs, it is possible to prevent the output and power transmission efficiency from being suddenly reduced.

According to the wireless charging system in accordance with embodiments of the present disclosure, it is possible to prevent the output of the receiving coil side and the power transmission efficiency transmitted from the transmitting coil side to the receiving coil side from being suddenly reduced even though the accurate positions of the transmitting coil and the receiving coil based on the x-axis and the y-axis deviate from each other even when the transmitting coil and the receiving coil are aligned to match each other.

Further, it is possible to reduce the size of the coil and thus, reduce the generated electromagnetic wave and save costs by obtaining the output amount of the receiving coil side and the power transmission efficiency transmitted from the transmitting coil side to the receiving coil side which may be obtained only by increasing the size of the coil without increasing the size of the coil.

Although the present disclosure has been described with reference to embodiments shown in the accompanying drawings, they are only examples. It will be appreciated by those skilled in the art that various modifications and equivalent other embodiments are possible from the present disclosure. Accordingly, an actual technical protection scope of the present disclosure is to be defined by the following claims.

What is claimed is:

1. A transmitting coil module used in a wireless charging system of a vehicle for transmitting power to a receiving coil module including a plurality of receiving coils by electronic resonance, the transmitting coil module comprising:
    a plurality of transmitting coils, wherein
    the plurality of transmitting coils have a winding structure which is formed by a conductive wire causing a direction of a magnetic field generated by any one of the plurality of transmitting coils different from a direction of a magnetic field generated by a transmitting coil directly adjacent to the one transmitting coil by making a current flow in the plurality of transmitting coils,
    the plurality of transmitting coils include a plurality of cores which are disposed on the transmitting coil module to be symmetrical to each other in a horizontal direction, a vertical direction, or a diagonal direction, the conductive wire is wound around the plurality of cores, and one end of the conductive wire is connected to and extends from a power supply unit, is wound in a first direction around a core included in a first coil of the plurality of transmitting coils, and is wound around a core included in a second coil of the plurality of transmitting coils, the second coil being symmetrical in a horizontal or vertical direction to the first coil and positioned directly adjacent thereto in a second direction.

2. The transmitting coil module of claim 1, wherein:

the transmitting coil module includes four unit transmitting coils that are each configured of a core and a portion of the conductive wire that is wound around the core.

3. The transmitting coil module of claim 1, wherein the conductive wire is wound in the first direction around cores which are included in a third coil of the plurality of transmitting coils and is wound in the second direction around cores which are included in a fourth coil of the plurality of transmitting coils, the third coil being symmetrical in a diagonal direction to the first coil, and the fourth coil being symmetrical in a diagonal direction to the second coil.

4. The transmitting coil module of claim 3, wherein the other end of the conductive wire is wound around a core included in the fourth coil and is connected to the power supply unit.

5. The transmitting coil module of claim 1, wherein the conductive wire extends from a power supply unit and is formed in a shape similar to a number eight in which cores included in the plurality of transmitting coils are wound and are disposed in front and rear directions of the vehicle.

* * * * *